Dec. 6, 1949     L. G. HILKEMEIER ET AL     2,490,215
MOUNTING FOR SPIRAL BLADING WITHIN
FRUSTO-CONICAL MIXING CHAMBERS
Filed Jan. 10, 1946

LOUIS G. HILKEMEIER
ELMER G. HAHN
*INVENTORS*

BY *George A. Evans*
           ATTORNEY

Patented Dec. 6, 1949

2,490,215

UNITED STATES PATENT OFFICE 2,490,215

MOUNTING FOR SPIRAL BLADING WITHIN FRUSTOCONICAL MIXING CHAMBERS

Louis G. Hilkemeier, West Allis, and Elmer G. Hahn, Wauwatosa, Wis., assignors to Chain Belt Company, Milwaukee, Wis., a corporation of Wisconsin Application January 10, 1946, Serial No. 640,212

1 Claim. (Cl. 259—175)

This invention relates to improvements in concrete mixers such as are mounted on motor trucks and is particularly concerned with the blading in the mixing drum. Heretofore in the art of manufacturing the mixing drum for truck mounted mixers it has been the practice to weld the spiral blading to the walls of the mixing chamber. In the most modern machines these mixing drums have been constructed with a frusto-conical end portion arranged so that the whole drum is pear shaped, and they are also mounted on an inclined axis. This construction readily facilitates a high point of discharge of the mixed aggregates, which feature is of considerable advantage in many instances.

In order to obtain the most efficient mixing action it has been found necessary to provide a mixing chamber with spiral blading; which blading effectively moves the mixing aggregate from one end of the mixing chamber to the other and returns it, all the while mixing the aggregate with itself and with water supplied to it, as it courses from end to end of the mixing chamber.

A concern to those interested in the art has been to make durable blading, for the abrasive action of the mixing aggregate on the blades forming the spiral, shortens their useful life. Also at the point where the spiral blade element is attached to the walls of the frusto-conical portion of the mixing chamber, either the holding weld is quickly abraded, or, the jointure builds up with hardened aggregate. Another problem of no small importance has been the removal of the spiral mixing blades once they became worn to a point of uselessness.

Because of the difficulty of fastening a spiral element to the interior of a cone-like surface it was the practice, prior to the advent of the present invention, to weld the blading to the shell itself.

This practice necessitates costly manufacture, painful replacement, and inaccurate positioning of the spiral blading.

It is the object of this invention to provide improved blading which will substantially withstand the harsh, abrasive action and shocks of the coursing aggregate.

It is further the object of this invention to provide readily detachable blading for a mixing vessel having a frusto-conical portion which is mounted with its axis inclined to the horizontal.

Another object of this invention is to provide improved mounting means to the interior of a substantially pear shaped mixing drum for spiral blade elements.

Referring to the drawings.

In the different views of the invention, like numerals refer to like parts throughout.

Figure 1:
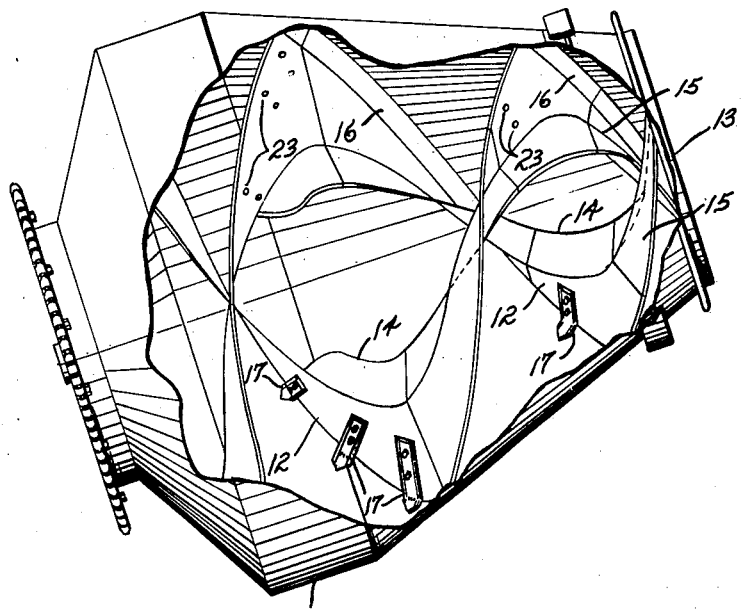
Fig. 1 is a side elevational view of the drum, with parts broken away, showing the blading affixed to the mixing drum.

Fig. 1 shows the mixing drum 11, which is mounted on an inclined axis substantially as shown, and illustrates the placement of the detachable mixing blades 12. The blading 12 is of the spiral type and is used to mix the aggregate and also to convey it longitudinally of the drum during charging and discharging operations. When discharging, these blades direct the materials constituting the finished mixed aggregates to the rearward portion of the mixing chamber or drum from whence they are expelled through an opening 13. The rearward part of each of the mixing blades 12 is provided with a lip portion 14 which confines the material lifted by the blades during rotation of the drum in the discharge direction. By confining the materials on the blades, a greater proportion is directed rearwardly and expelled through the opening.

The blades 12 are preferably made in segments which are fitted with their ends abutting so as to form continuous spirals. We have found that the most rearward of these segments, i. e., the segments 15, which terminate at the opening 13, may be best secured to the walls of the drum by welding or other means of permanent securement. The other portions or segments are detachably mounted as hereinafter described.

Permanent securement of the end segments 15 has been found desirable because a weld may be made along the entire jointure of the blade and the drum, thereby increasing the area of support, and because the end segments are pitched steeper to produce a "chuting" rather than a tumbling effect, the welds are not as rapidly abraded as are the more remote segments which effect primarily tumbling of the mix.

Figure 3:
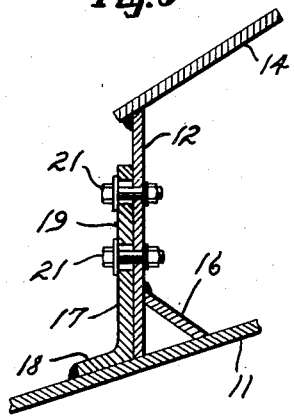
Fig. 3 is a sectional view at right angles to the blade showing the blade elements attached to the holding means.

Fillets 16, refer to Figs. 1 and 3, which are welded to each of the blade elements 12, extend over the jointure of the blading and the drum and forestall the building up of concrete in what would otherwise be a sharp pocket. The fillet 16 which is secured to the end spiral segment 15 is also welded to the drum, but the other fillets are secured only to the blading, thereby making the latter blading completely detachable.

The detachable blade portions are supported by clips 17, which are constructed of metal and have a triangular base 18 with a transverse upstanding portion 19. The base conforms to the conical surface most readily. In fact, in some instances along the spiral blading, one leg of the triangular base coincides with the radial lines of the cone. This precludes a great amount of the bridging which would otherwise exist if a flat surface were fitted against the conical wall of the drum. Also it readily facilitates the positioning of the clip in the fabrication of the complete mixing vessel.

Another advantage of this construction is that in reducing the bridging effect, i. e., the open space between the base of the clip and the wall of the frusto-conical mixing chamber, less weld is needed to securely fasten the clip to the walls of the drum. Hence, the likelihood of burning through the drum in fabrication, using welding means, is lessened.

The flexibility of the improved clip is apparent from Fig. 3. Here the clip is shown with its triangular base 18 fastened to the conical wall 11 and with its upstanding portion 19 bent forward to position the blading so that the sections as shown in Fig. 3 are perpendicular to the axis of the drum. The filleted or curved edges of the clip are indicated at 20 in Fig. 4. These edges 20 may be as shown, or the entire top surface of the upstanding projection 19 may be curved so that the concrete may readily pass over it. This effectively eliminates any surface normal to the flow of the mixing aggregate.

Fig. 3 is a cross section through the blading mounted to the mixing chamber. The blade elements 12 are attached to the clips 17 by means of bolts 21 or other holding means which extend through oblong apertures 22 in the holders and circular apertures 23 in the blades. It will be noted from this view that the fillet 16 is welded to the blade element 12, however, it merely abuts the wall of the mixing chamber 11. This, of course, insures complete detachability and yet protects the jointure of the blade and walls of the mixing chamber and eliminates the building up of aggregate at this point.

Figure 2:
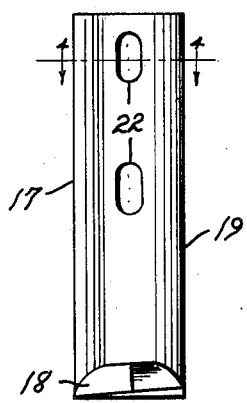
Fig. 2 is a front elevation of one of the mounting instrumentalities.
Figure 4:
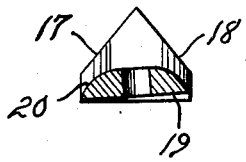
Fig. 4 is a section taken along the line 4—4 of Fig. 2.

To compensate for the spiral shape of the blade and to cause the upstanding portion 19 of the holder to lie flat against the back of the blade, the portion 19 may be twisted as shown in Fig. 4, and the foot portion 18, as shown in Fig. 2, may also be twisted to permit both of the trailing edges thereof to be fitted up and welded to the wall of the drum. In different parts of the drum, the amount of the twist on these portions of the clip will vary, but in all cases a standard clip may be employed which can be easily shaped, by twisting, to fit any point of jointure between the blading and the drum.

Having thus described the invention, we claim:

In a drum for concrete mixers and the like arranged to rotate and having an axial opening at one end, a continuous spiral blade extending inwardly from the perimetrical walls of said drum and terminating adjacent said opening, said blade being made in segments with the portion adjacent the opening permanently secured to the drum and pitched at a steeper angle than the segments remote therefrom, whereby the material in the drum may be rapidly discharged through said openings and means detachably securing to the walls of the drum the segments of the blade remote from the opening.

LOUIS G. HILKEMEIER.
ELMER G. HAHN.

REFERENCES CITED

The following references are of record in the file of this patent:

UNITED STATES PATENTS

| Number | Name | Date |
|---|---|---|
| 1,058,803 | Smith | Apr. 15, 1913 |
| 1,322,575 | Jaeger | Nov. 25, 1919 |
| 1,475,904 | Vandenplas | Nov. 27, 1923 |
| 1,781,823 | Robbins | Nov. 18, 1930 |
| 2,088,099 | Venable | July 27, 1937 |
| 2,167,243 | Lichtenberg | July 25, 1939 |
| 2,254,639 | Andrae | Sept. 2, 1941 |

FOREIGN PATENTS

| Number | Country | Date |
|---|---|---|
| 490,474 | Germany | Dec. 30, 1926 |